United States Patent [19]
Kuwayama et al.

[11] Patent Number: 5,841,887
[45] Date of Patent: Nov. 24, 1998

[54] INPUT DEVICE AND DISPLAY SYSTEM

[75] Inventors: Yukiko Kuwayama; Hisashi Amafuji, both of Kyoto, Japan

[73] Assignee: Shimadzu Corporation, Kyoto, Japan

[21] Appl. No.: 685,984

[22] Filed: Jul. 22, 1996

[30] Foreign Application Priority Data

Jul. 25, 1995 [JP] Japan .................................. 7-210082

[51] Int. Cl.$^6$ .............................. G06K 9/00; G09G 5/08
[52] U.S. Cl. .......................................... 382/118; 345/156
[58] Field of Search ............................ 345/8, 156, 326, 345/163; 382/115, 118

[56] References Cited

U.S. PATENT DOCUMENTS

| | | | |
|---|---|---|---|
| 5,281,957 | 1/1994 | Schoolman | 345/8 |
| 5,298,919 | 3/1994 | Chang | 345/163 |

FOREIGN PATENT DOCUMENTS

| | | |
|---|---|---|
| 0 285 315 | 10/1988 | European Pat. Off. . |
| 2 254 228 | 9/1992 | United Kingdom . |
| WO 93/03475 | 2/1993 | WIPO . |

OTHER PUBLICATIONS

James D. Foley, Scientific American, vol. 257, No. 4, pp. 83–86 and 88–90, Oct. 1, 1987, "Interfaces for Advanced Computing".

IBM Technical Disclosure Bulletin, vol. 35, No. 48, pp. 321–322, Sep. 1, 1992, "Spatial Mouse".

*Primary Examiner*—Jose L. Couso
*Assistant Examiner*—Duy M. Dang
*Attorney, Agent, or Firm*—Oblon, Spivak, McClelland, Maier & Neustadt, P.C.

[57] ABSTRACT

The position an orientation of an input device body in the actual space are sensed. The manipulated variable of an operating member, which is present in the actual space so as to be operated without changing the position and orientation of the input device body, is sensed. A pointing image is generated on a screen according to the position and orientation of the input device body and the manipulated variable of the operating member. The point indicated by the pointing image on the screen is changed according to the change of the position and orientation of the input device body and the change of the manipulated variable of the operating member.

4 Claims, 4 Drawing Sheets

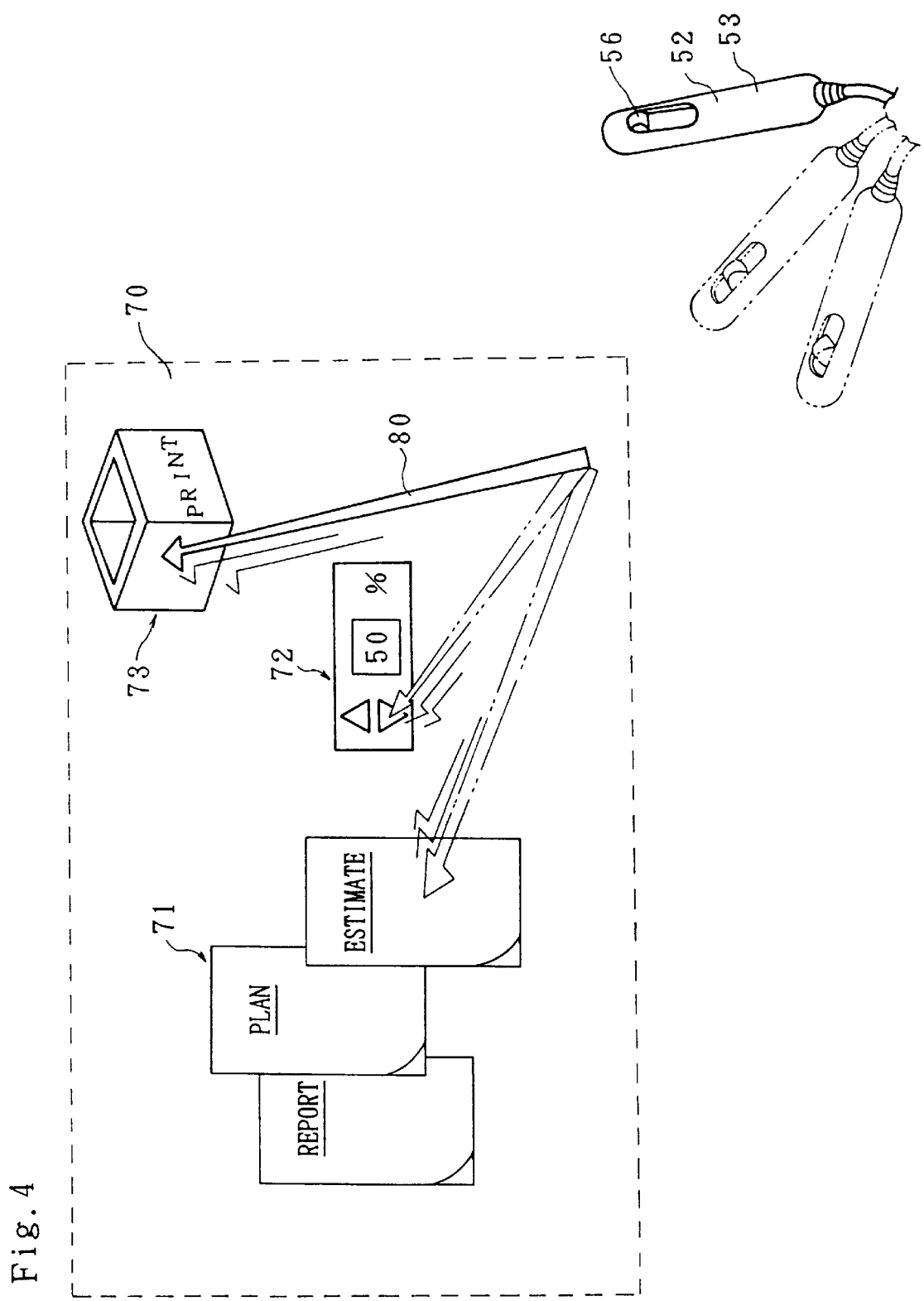

INPUT DEVICE AND DISPLAY SYSTEM

FIELD OF THE INVENTION

The present invention relates to an input device for generating a pointing image on a screen, and a display system incorporating the input device. For example, the present invention is suitable for work instruction on a screen used to create an artificial space like a virtual reality world.

DESCRIPTION OF RELATED ART

For example, an input device known as the 3-dimensional mouse or 3-dimensional pointer is used to generate a pointing image, such as an arrow or the like, on a screen used to create a virtual reality world. Such a conventional input device has an input device body which is present in the actual space, means of sensing the position and orientation of the input device body in the actual space, and means of creating a pointing image on a screen according to the position and orientation of the input device body, wherein the point indicated by the pointing image on the screen is changed according to the change of the position and orientation of the input device body.

Such an input device make it possible to synchronize the motion of the input device body in the actual space with the motion of the pointing image on the screen. Therefore, it contributes to the experience of more realistic virtual reality world with increased feeling of presence, particularly when it is used for inputting a work instruction in an artificial 3-dimensional space formed from a stereoscopic image generated by a head-mounted display.

In the conventional input device, however, the pointing image is created by sensing nothing more than the position and orientation of the input device body in the actual space. In other words, the shift of the pointing image on the screen must be one-to-one correspondence to the change of the position and orientation of the input device body in the actual space. This means that the amount of shift of the input device body in the actual space becomes excessive when the pointing image is shifted on the entire screen. Particularly when the input device body in a hand is shifted in an actual 3-dimensional space, the operator must move his or her hand over a considerable wide range, posing the problems of poor operatability and limited location of use.

Accordingly, the object of the present invention is to provide an input device and display system free of the above-described problems in the prior art.

SUMMARY OF THE INVENTION

The input device of the present invention has an input device body which is present in the actual space, means for sensing the position and orientation of the input device body in the actual space, an operating member which is present in the actual space, the operating member being able to be operated without changing the position and orientation of the input device body, means for sensing the manipulated variable of the operating member, and means for generating a pointing image on a screen according to the position and orientation of the input device body and the manipulated variable of the operating member, wherein the point indicated by the pointing image on the screen can be changed according to the change of the position and orientation of the input device body and the change of the manipulated variable of the operating member.

According to the constitution of the present invention, a pointing image can be formed on a screen, not only according to the position and orientation of the input device body, but also according to the manipulated variable of the operating member which can be operated without changing the position and orientation of the input device body. Therefore, the point indicated by the pointing image on the screen can be changed from a point corresponding to the position and orientation of the input device body in the actual space without shifting the input device body. This results in extension of the area indicatable without shifting the input device body, thus reducing the operator's hand motion for pointing the entire area on the screen. In other words, the input device of the present invention offers improved ease of operation and can be used in narrow places.

It is preferable that the point indicated by the pointing image on the screen is changed according to the change of the manipulated variable of the operating member along the sensed orientation of the input device body in the actual space. By this constitution, the point indicated by the pointing image is changed according to the change of the manipulated variable of the operating member. The direction of the change of the indicated point based on the operation of the operating member corresponds to the orientation of the input device body, so that indication of the target point is facilitated.

It is preferable that the operating member is incorporated in the input device body so as to be shifted relative to the input device body, and the manipulated variable of the operating member can be changed by a finger of the operator who holds the input device body. By this constitution, it is possible to change the position and orientation of the input device body simultaneously with the change of the manipulated variable of the operating member.

The display system of the present invention has the input device of the present invention, wherein the pointing image is displayed by a head-mounted display mounted on an operator, who operates the input device body and operating member. Displaying of the pointing image by the head-mounted display contributes to the experience of more realistic virtual reality world with increased feeling of presence on a screen used to create a virtual reality space.

BRIEF DESCRIPTION OF THE DRAWINGS

FIG. 4 is a schematic diagram of the operation of the input device of an embodiment of the present invention.

DETAILED DESCRIPTION OF PREFERRED EMBODIMENT

An embodiment of the present invention is hereinafter described with reference to drawings.

Figure 1:
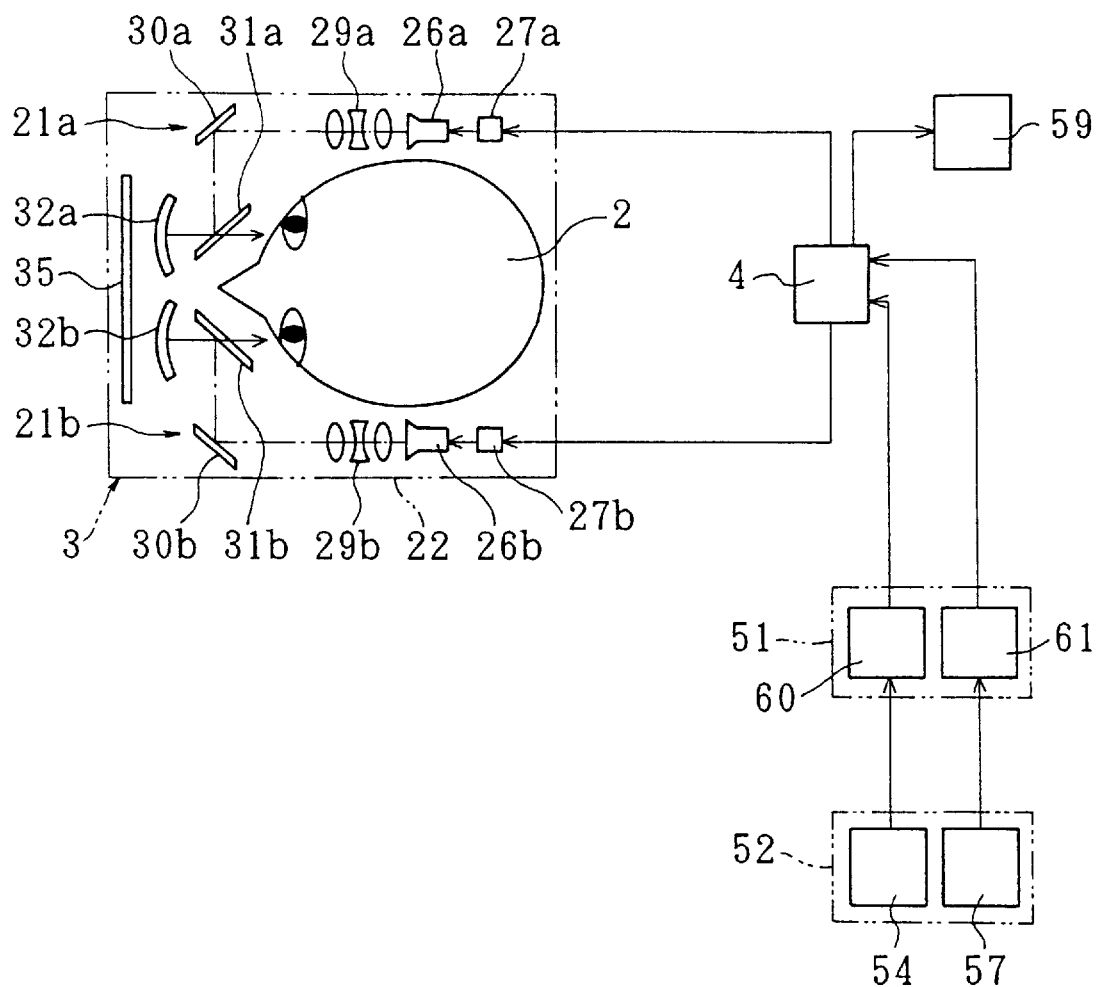
FIG. 1 is a schematic diagram of the constitution of the input device of an embodiment of the present invention.

An image display system illustrated in FIG. 1 has a head-mounted display 3 to be mounted on the head of an observer (operator) 2, and a control device 4. The control device 4 is configured with a computer having a central processing unit and memory. As described later, this control device 4 generates image data according to the signal from a sensor 54 in an input device body 52 and the signal from a adjusting knob (operating member) 56, and transmits both the generated image data and the image data stored in the memory to the head-mounted display 3 as image signals.

Figure 2:
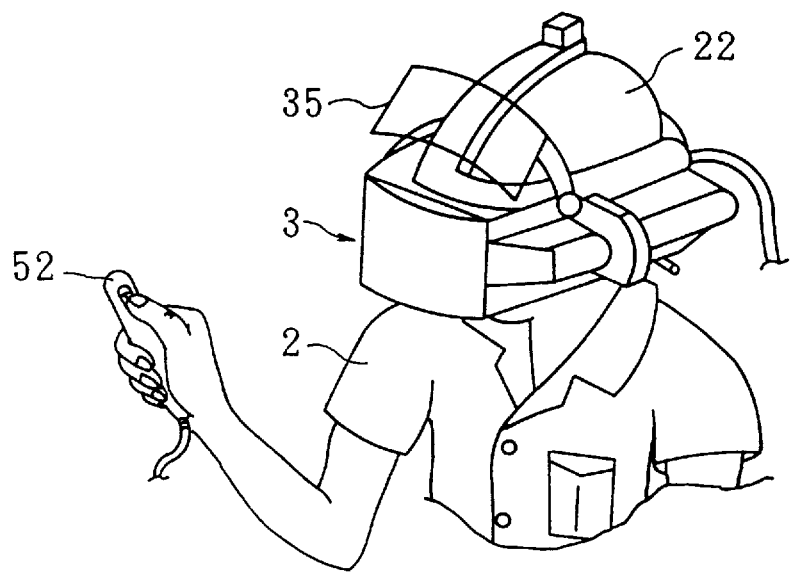
FIG. 2 is a schematic diagram of the operation of the input device body of an embodiment of the present invention.

The head-mounted display 3 has a left-right pair of display portions 21a, 21b, and a head mounting holder 22 which holds the two display portions 21a, 21b. As illustrated in FIG. 2, the holder 22 has a shape, for example, of helmet so as to be mounted on the head of the observer 2. Upon mounting the holder 22, the two display portions 21a, 21b are positioned at a given position in the visual field of the observer 2. The term "head" in the present invention is defined as the observer's body portion above the neck, including the face.

Each of the display portions 21a, 21b has a display element 26a, 26b, such as a CRT display, liquid crystal display panel or the like, a display control device 27a, 27b for controlling the display element 26a, 26b, and an optical system. Each of the display control devices 27a, 27b transmits the image signal from the control device 4 to the display element 26a, 26b, so that an image corresponding to the image signal is generated on the screen of the display element 26a, 26b. Each optical system has a lens system 29a, 29b, a mirror 30a, 30b, a first optical combiner 31a, 31b such as a half mirror, and a second optical combiner 32a, 32b such as a half mirror. The rays for displaying the image generated by the display elements 26a, 26b are reflected by the mirrors 30a, 30b and first optical combiners 31a, 31b through the lens systems 29a, 29b, then reflected and focused by the second optical combiners 32a, 32b, followed by transmission through the first optical combiners 31a, 31b, after which the rays are introduced to the eyes of the observer 2, whereby the image generated by one display portion 21a is recognized by one of the eyes of the observer 2, and the image generated by the other display portion 21b is recognized by the other eye of the observer 2. The image generated by one display portion 21a can be different from the image generated by the other display portion 21b so that the observer 2 visually recognizes a stereoscopic image. In front of the second optical combiners 32a, 32b, a visor 35 is attached to the holder 22 in a manner such that it is vertically movable. When the visor 35 is shifted downward, the observer 2 can exclusively recognize the images generated by the display elements 26a, 26b. When the visor 35 is shifted upward, the observer 2 can recognize not only the images generated by the display elements 26a, 26b but also the actual object, which is present in the visual field in front of the optical combiners 31a, 31b, 32a, 32b.

Figure 3:
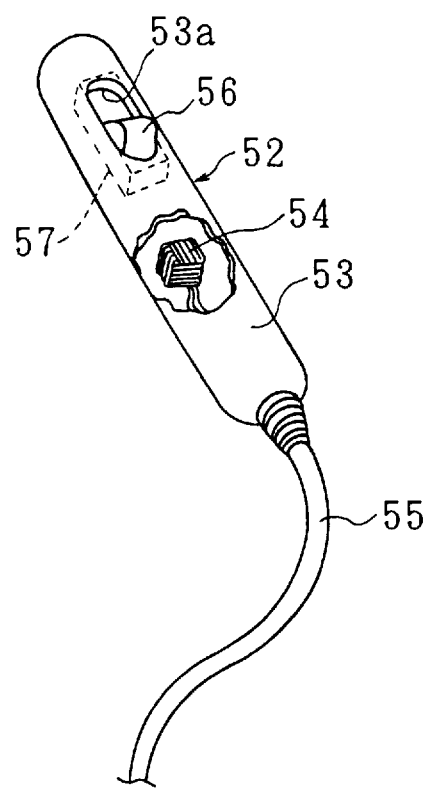
FIG. 3 is an oblique view of the input device body of an embodiment of the present invention.

The control device 4 is connected with the input device body 52 via a controller 51. The control device 4 is also connected with a printer 59. As illustrated in FIG. 2, the input device body 52 is of such size that it can be held in one hand by the observer 2. As illustrated in FIG. 3, the input device body 52 has a cylindrical housing 53 and a sensor 54 housed in the housing 53, and is connected to the controller 51 via a wire 55. The adjusting knob (operating member) 56 is incorporated in the input device body 52 so as to be shifted relative to the input device body 52.

The sensor 54 senses the 3-dimensional coordinates of the input device body 52 and the angles of rotation around the respective coordinate axes, with reference to the zero point previously determined in the actual space. This sensor 54 is exemplified by a self-contained position sensing device, which self-containedly senses the position and orientation of the input device body 52 by using a gyro, acceleration sensor or the like without interaction with external conditions. The configuration of this sensor 54 is not limited, as long as it is capable of sensing the position and orientation of the input device body 52.

The adjusting knob 56 can be shifted by a finger of the observer 2, who holds the input device body 52, without changing the position and orientation of the input device body 52. To be more precise, the adjusting knob 56 is provided in a manner such that it can be linearly reciprocally shifted back and forth along the longitudinal direction of the cylindrical housing 53 in an opening 53a, which is formed on the front side of the housing 53. The distance of the reciprocal shift of the adjusting knob 56 corresponds to the manipulated variable of the adjusting knob 56. A sensor 57 for sensing the manipulated variable of the adjusting knob 56 is incorporated in the housing 53. The sensor 57 for sensing the manipulated variable can be configured with a potentiometer or the like.

The controller 51 has a data processing unit 60 which converts signals from the sensor 54 into data processible by the control device 4, and an input/output interface 61 which converts signals from the sensor 57 for sensing the manipulated variable into data processible by the control device 4.

The control device 4 generates the image signal according to both the signal, which is entered from the sensor 54 via the data processing unit 60 and corresponds to the position and orientation of the input device body 52, and the signal, which is entered from the sensor 57 for sensing the manipulated variable via the input/output interface 61 and corresponds to the manipulated variable of the adjusting knob 56. The generated image signal is transmitted to the head-mounted display 3.

FIG. 4 shows an example image formed by the image signal from the control device 4 on the screen 70 of the head-mounted display 3 of the present embodiment. The image is used to read out a file constituting a target document from among the files stored in the control device 4, determine size reduction rate for printing, and print out the document via the printer 59. On this screen 70, first icons 71 indicating title of documents, a second icon 72 indicating size reduction rate setting key, and a third icon 73 indicating printing out instruction are displayed in a manner such that they are recognized as a stereoscopic image by the observer 2. The second icon 72 is recognized at the nearest position and the third icon 73 is recognized at the farthermost position to the observer 2.

On the screen 70, an arrow-like pointing image 80 is formed by the image signal from the control device 4. The point indicated by the pointing image 80 on the screen 70 can be changed according to the change of the position and orientation of the input device body 52 and the change of the manipulated variable of the adjusting knob 56.

In the present embodiment, the rear end side of the cylindrical housing 53 of the input device body 52 corresponds to the rear end side of the arrow-like pointing image 80. The position of the rear end of the pointing image 80 is shifted according to the change of the position of the input device body 52 in the actual space.

The longitudinal direction of the cylindrical housing 53 of the input device body 52 corresponds to the indicating direction of the pointing image 80. The indicating direction changes according to the change of the orientation of the input device body 52 in the actual space.

The length of the pointing image 80 along the indicating direction changes according to the change of the manipulated variable of the adjusting knob 56 in the actual space. The length of the pointing image 80 is maximum when the adjusting knob 56 is at the front end side, and minimum when the adjusting knob 56 is at the rear end side relative to the housing 53. Accordingly, arbitrary scalar can be given to the arrow-like pointing image 80 corresponding to a fundamental vector by operating the adjusting knob 56, whereby the point indicated by the pointing image 80 on the screen 70 is changed according to the change of the manipulated variable of the adjusting knob 56 along the orientation of the input device body 52 sensed in the actual space. Shortly, the point indicated by the pointing image 80 can be changed according to the change of the manipulated variable of the adjusting knob 56. Because the direction of the change of the indicated point based on the operation of the adjusting knob 56 corresponds to the orientation of the input device body 52, indication of the target point is facilitated.

According to the above constitution, the pointing image 80 can be formed on a screen 70, not only according to the position and orientation of the input device body 52, but also according to the manipulated variable of the adjusting knob 56 which can be operated without changing the position and orientation of the input device body 52. Therefore, the point indicated by the pointing image 80 on the screen 70 can be changed from a point corresponding to the position and orientation of the input device body 52 in the actual space without shifting the input device body 52. This results in extension of the area indicatable without shifting the input device body 52, thus reducing the operator's hand motion for pointing the entire area on the screen, in the present embodiment, there is no need to move the rear end of the input device body 52 over a considerable wide range, which is required in the prior art device. In other words, as indicated by the double dotted line in FIG. 4, it is possible to change the orientation and length of the pointing image 80 according to the change of the orientation of the input device body 52 and the change of the manipulated variable of the adjusting knob 56 without changing the position of the rear end of the input device body 52, so that the icons 71, 72, 73 can be indicated by the pointing image 80. Accordingly, this constitution ensures improved ease of operation and usability in narrow places.

The present invention is not limited to the above embodiment. For example, the screen on which the pointing image is formed is not limited to the screen of the head-mounted display, and can be an ordinary CRT display screen. The image, which is a stereoscopic image in the above embodiment, can be a plane image. The input device body, which moves 3-dimensionally in the above embodiment, can move only 2-dimensionally. The input device body 52 can be equipped with a ten-key pad, click buttons, etc. Alternatively, the above-described input device can be used in combination with a keyboard type input device. The structure of the operating member is not limited to the above-described linearly moving adjusting knob, for example, in the event that the pointing image 80 like a fundamental vector as described above is formed, the manipulated variable can be adjusted by two push buttons for the "extension" and "shrinkage" of the image. Further, rotary type knob, push button type trimmer adjusting the manipulated variable according to the amount of its pushing, and the like are usable. Furthermore, the shape of the pointing image is not limited to an arrow.

What is claimed is:

1. An input device, comprising:

an input device body which is present in the actual space;

means for sensing the three-dimensional physical position and orientation of the input device body in the actual space and for sensing a change in the three-dimensional physical position and orientation of the input device body in the actual space;

an operating member which is present in the actual space;

the operating member being able to be operated without changing the three-dimensional position and orientation of the input device body;

means for sensing the manipulated variable of the operating member; and means for generating a pointing image on a screen according to the three-dimensional position and orientation of the input device body and the manipulated variable of the operating member; wherein the point indicated by the pointing image on the screen is changed according to the change of the three-dimensional physical position and orientation of the input device body and the change of the manipulated variable of the operating member.

2. The input device according to claim 1, wherein:

the point indicated by the pointing image on the screen is changed according to the change of the manipulated variable of the operating member along the sensed orientation of the input device body in the actual space.

3. The input device according to claim 1, wherein:

the operating member is incorporated in the input device body so as to be shifted relative to the input device body, and the manipulated variable of the operating member can be changed by a finger of an operator who holds the input device body.

4. A display system, comprising:

an input device body which is present in the actual space;

means for sensing the three-dimensional physical position and orientation of the input device body in the actual space and for sensing a change in the three-dimensional physical position and orientation of the input device body in the actual space;

an operating member which is present in the actual space;

the operating member being able to be operated without changing the three-dimensional position and orientation of the input device body;

means for sensing the manipulated variable of the operating member; and means for generating a pointing image on a screen according to the three-dimensional position and orientation of the input device body and the manipulated variable of the operating member; wherein the pointing image is displayed by a head-mounted display mounted on an operator, who operates the input device body and operating member, and wherein the point indicated by the pointing image on the screen is changed according to the change of the three-dimensional physical position and orientation of the input device body and the change of the manipulated variable of the operating member.

* * * * *